(12) United States Patent
Lo et al.

(10) Patent No.: US 9,045,998 B2
(45) Date of Patent: Jun. 2, 2015

(54) SYSTEM FOR DIRECTING AIR FLOW TO A PLURALITY OF PLENA

(75) Inventors: Charles Lo, Peoria, AZ (US); Ted Alford, Mesa, AZ (US); Morris Anderson, Mesa, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 713 days.

(21) Appl. No.: 13/316,960

(22) Filed: Dec. 12, 2011

(65) Prior Publication Data

US 2013/0145744 A1   Jun. 13, 2013

(51) Int. Cl.
| F02K 7/08 | (2006.01) |
| F02K 7/10 | (2006.01) |
| F01D 17/10 | (2006.01) |
| F02K 3/115 | (2006.01) |
| F02K 3/075 | (2006.01) |
| F02C 7/141 | (2006.01) |

(52) U.S. Cl.
CPC .............. *F01D 17/105* (2013.01); *F02K 3/115* (2013.01); *F02K 3/075* (2013.01); *F02C 7/141* (2013.01); *Y02T 50/675* (2013.01)

(58) Field of Classification Search
CPC ............... F02K 7/10; F02K 7/12; F02K 9/50; Y02T 50/675
USPC .......................... 60/266, 267, 767, 269, 226.1
See application file for complete search history.

(56) References Cited

U.S. PATENT DOCUMENTS

| 3,477,230 A | 11/1969 | Bauger et al. |
| 3,528,250 A | 9/1970 | Johnson |
| 3,842,597 A | 10/1974 | Ehrich |
| 4,187,675 A | 2/1980 | Wakeman |
| 4,254,618 A | 3/1981 | Elovic |
| 5,012,646 A | 5/1991 | Speer |
| 5,114,103 A | 5/1992 | Coffinberry |
| 5,137,230 A | 8/1992 | Coffinberry |
| 5,143,329 A | 9/1992 | Coffinberry |
| 5,150,569 A | 9/1992 | Chapman |
| 5,161,369 A | 11/1992 | Williams |
| 5,167,117 A | 12/1992 | Herzog et al. |
| 5,392,614 A | 2/1995 | Coffinberry |
| 5,725,180 A | 3/1998 | Chamay et al. |
| 5,918,458 A | 7/1999 | Coffinberry et al. |
| 6,106,229 A | 8/2000 | Nikkanen et al. |
| 6,349,899 B1 | 2/2002 | Ralston |

(Continued)

FOREIGN PATENT DOCUMENTS

WO   9703281 A1   1/1997

OTHER PUBLICATIONS

USPTO Office Action, Notification Date Dec. 3, 2014; U.S. Appl. No. 13/358,161.

*Primary Examiner* — Craig Kim
(74) *Attorney, Agent, or Firm* — Ingrassia Fisher & Lorenz, P.C.

(57) ABSTRACT

A system for directing air flow to separate plena of a compartment that is defined at least by a compartment wall includes a NACA scoop, and a Pitot scoop. The NACA scoop is formed in the compartment wall, and includes two side walls, a bottom wall, and an entrance lip that is defined by the compartment wall and is spaced apart from the bottom wall to form a NACA scoop air inlet. The Pitot scoop is longitudinally aligned with the NACA scoop, includes a Pitot scoop air inlet, a Pitot scoop air outlet, and a Pitot scoop flow passage.

14 Claims, 7 Drawing Sheets

(56) References Cited

U.S. PATENT DOCUMENTS

| | | |
|---|---|---|
| 7,014,144 B2 | 3/2006 | Hein et al. |
| 7,624,944 B2 | 12/2009 | Parikh et al. |
| 7,861,512 B2 | 1/2011 | Olver et al. |
| 7,861,968 B2 * | 1/2011 | Parikh et al. ............... 244/118.5 |
| 7,926,261 B2 | 4/2011 | Porte |
| 2008/0095611 A1 | 4/2008 | Storage et al. |
| 2011/0036939 A1 | 2/2011 | Easter |

* cited by examiner

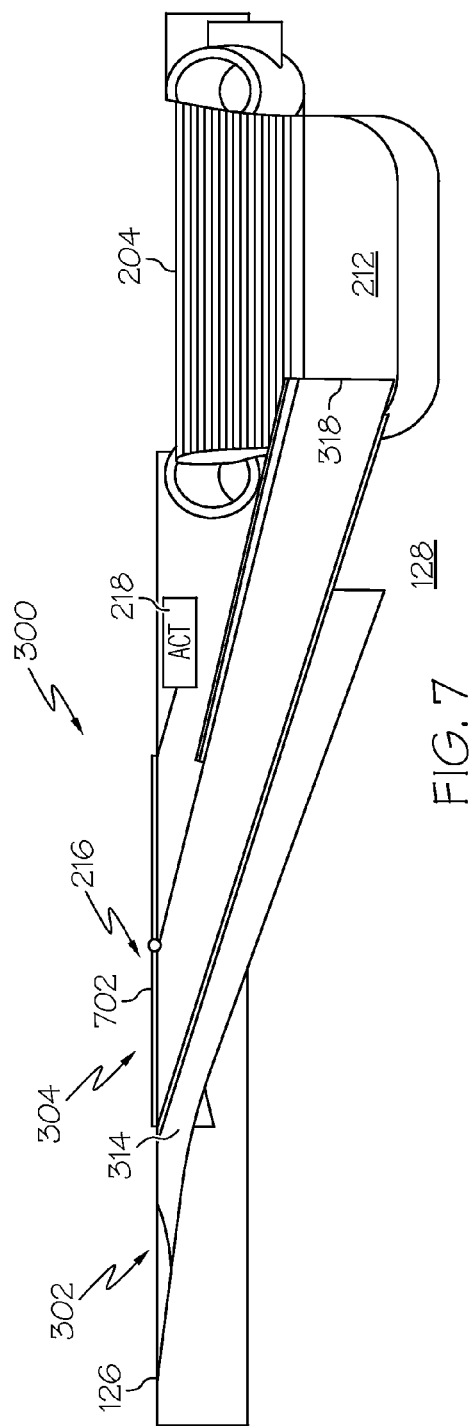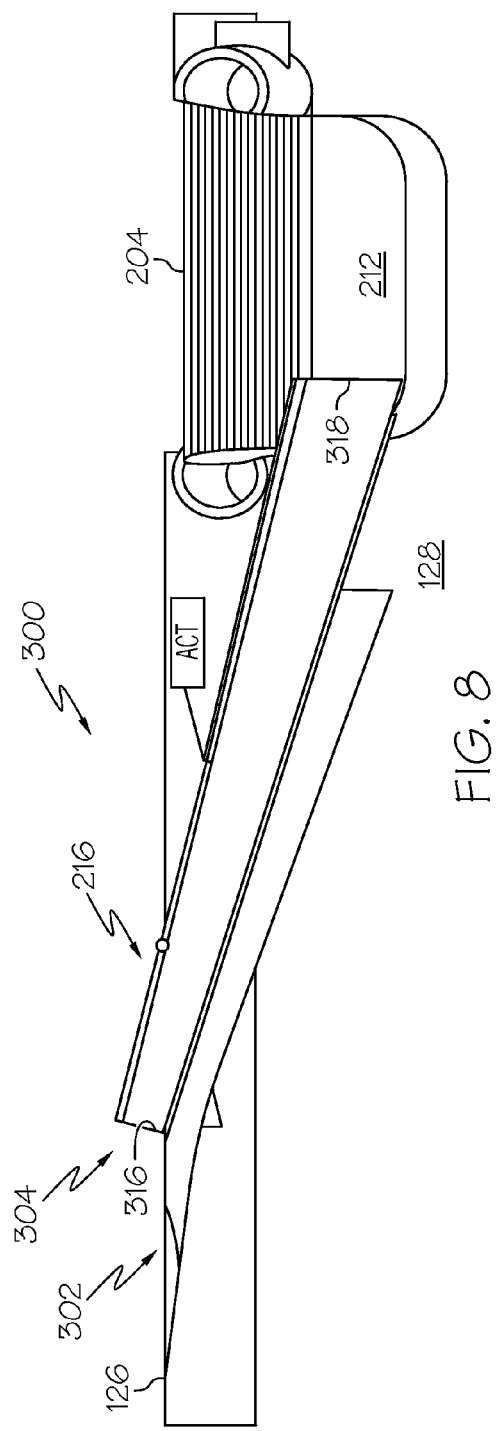

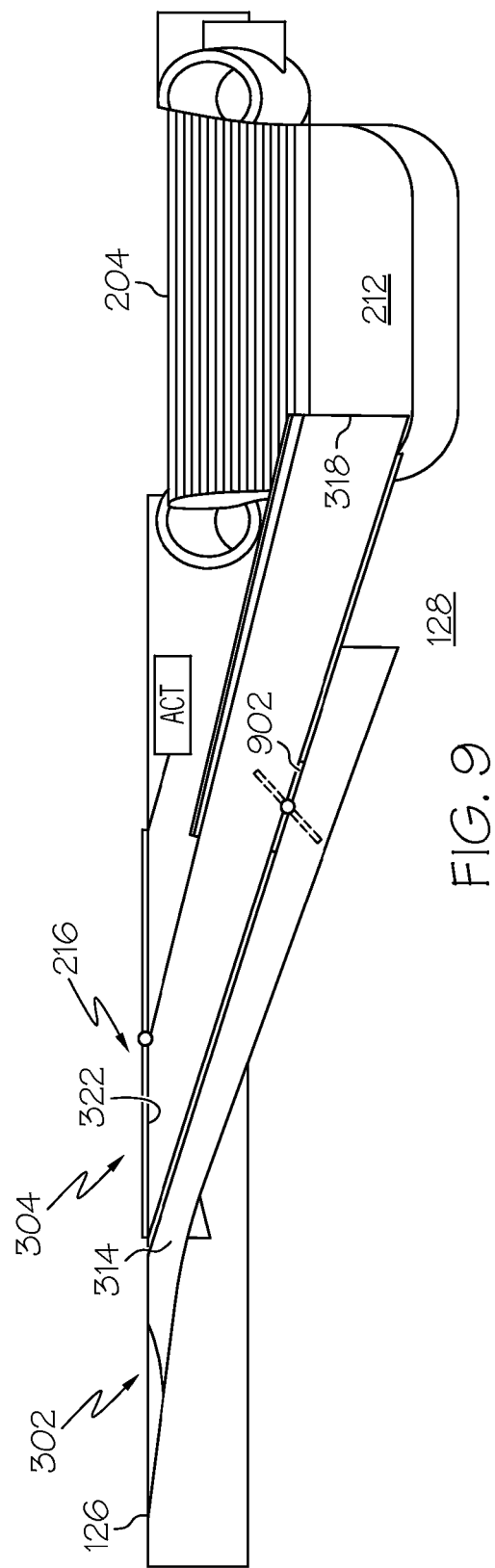

SYSTEM FOR DIRECTING AIR FLOW TO A PLURALITY OF PLENA

STATEMENT REGARDING FEDERALLY SPONSORED RESEARCH OR DEVELOPMENT

This invention was made with Government support under FA8650-09-D-2925-003 awarded by the U.S. Air Force. The Government has certain rights in this invention.

TECHNICAL FIELD

The present invention generally relates to systems for directing air flow, and more particularly relates to a system for directing air flow to a plurality of plena, such as in a turbofan gas turbine propulsion engine.

BACKGROUND

In the field of gas turbine technology a great deal of effort has been, and continues to be, directed toward improving thermodynamic efficiency by operating gas turbine engines at ever increasing temperatures. These temperatures may exceed the temperatures that some materials within the turbine engine structure can normally tolerate. As such, cooling air may be provided to various turbine engine components using cooling air extracted from other parts of the engine. For example, in some gas turbine engines cooling air is extracted from a plenum at the discharge of the compressor, and is then directed to certain portions of the turbine.

For some gas turbine engines, the air that is extracted from the engine for turbine cooling may be at temperatures that require the air to be cooled before being directed to the turbine. In some turbofan gas turbine propulsion engines, a portion of the fan air flowing in the bypass duct may be redirected and used to cool the extracted turbine cooling air. During some operational levels of the turbofan engine, the flow rate of the fan air that is redirected may be insufficient to adequately cool the extracted air.

Hence, there is a need for a system that will ensure the flow rate of redirected fan air is sufficient to adequately cool air that is extracted for turbine cooling air. The present invention addresses at least this need.

BRIEF SUMMARY

In one embodiment, a system for directing air flow to separate plena of a compartment that is defined at least by a compartment wall includes a NACA scoop and a Pitot scoop. The NACA scoop is formed in the compartment wall, and includes two side walls, a bottom wall, and an entrance lip. The entrance lip is defined by the compartment wall and is spaced apart from the bottom wall to form a NACA scoop air inlet that extends through the compartment wall. The Pitot scoop is longitudinally aligned with the NACA scoop, includes a Pitot scoop air inlet, a Pitot scoop air outlet, and a Pitot scoop flow passage between the Pitot scoop air inlet and the Pitot scoop air outlet. The Pitot scoop air inlet is defined, at least partially, by the entrance lip.

In another embodiment, a system for directing air flowing in a turbofan engine bypass flow passage into separate plena includes an outer fan duct, an inner fan duct, a NACA scoop, and a Pitot scoop. The outer fan duct is spaced apart from and surrounds the inner fan duct to define the bypass flow passage between the outer and inner fan ducts. The NACA scoop is formed in the inner fan duct, includes two side walls, a bottom wall, and an entrance lip. The entrance lip is defined by a portion of the inner fan duct and is spaced apart from the bottom wall to form a NACA scoop air inlet that extends through the inner fan duct to fluidly communicate the bypass flow passage with a first plenum. The Pitot scoop is longitudinally aligned with the NACA scoop, includes a Pitot scoop air inlet, a Pitot scoop air outlet, and a Pitot scoop flow passage between the Pitot scoop air inlet and the Pitot scoop air outlet. The Pitot scoop air inlet is defined, at least partially, by the entrance lip, and the Pitot scoop air outlet is in fluid communication with a second plenum.

In yet another embodiment, a system for supplying turbine cooling air flow includes a turbofan engine, a NACA scoop, a heat exchanger, and a Pitot scoop. The turbofan engine includes an engine case and a bypass flow passage. The engine case has an inner volume within which at least a gas turbine engine is mounted. The bypass flow passage is defined by an outer fan duct and an inner fan duct and is configured to direct fan air flow therethrough. The NACA scoop is formed in the inner fan duct, and includes two side walls, a bottom wall, and an entrance lip. The entrance lip is defined by the inner fan duct and is spaced apart from the bottom wall to form a NACA scoop air inlet that extends through inner fan duct to a first plenum. The heat exchanger is disposed within the turbofan engine and includes a heat exchanger first flow passage and a heat exchanger second flow passage. The heat exchanger first flow passage is coupled to receive engine air from within the engine case. The heat exchanger second flow passage is coupled to selectively receive fan air from a second plenum. The heat exchanger is configured to transfer heat between the engine air and the fan air. The Pitot scoop is longitudinally aligned with the NACA scoop, and includes a Pitot scoop air inlet, Pitot scoop air outlet, and a Pitot scoop flow passage between the Pitot scoop air inlet and the Pitot scoop air outlet. The Pitot scoop air inlet is defined, at least partially, by the entrance lip. The Pitot scoop air outlet is in fluid communication with the second plenum.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 7 and 8 depict simplified cross section views of an alternative embodiment of the air flow directing system with the door in an open position and a closed position, respectively; and FIG. 9 depicts simplified cross section view of yet another alternative embodiment of the air flow directing system.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although the system for directing air flow that is described herein is done so in the context of a turbofan gas turbine propulsion engine, the system is not limited to this application. Indeed, it may be implemented in numerous applications to improve performance. Some non-limiting examples include auxiliary power units and environmental control systems.

Figure 1:
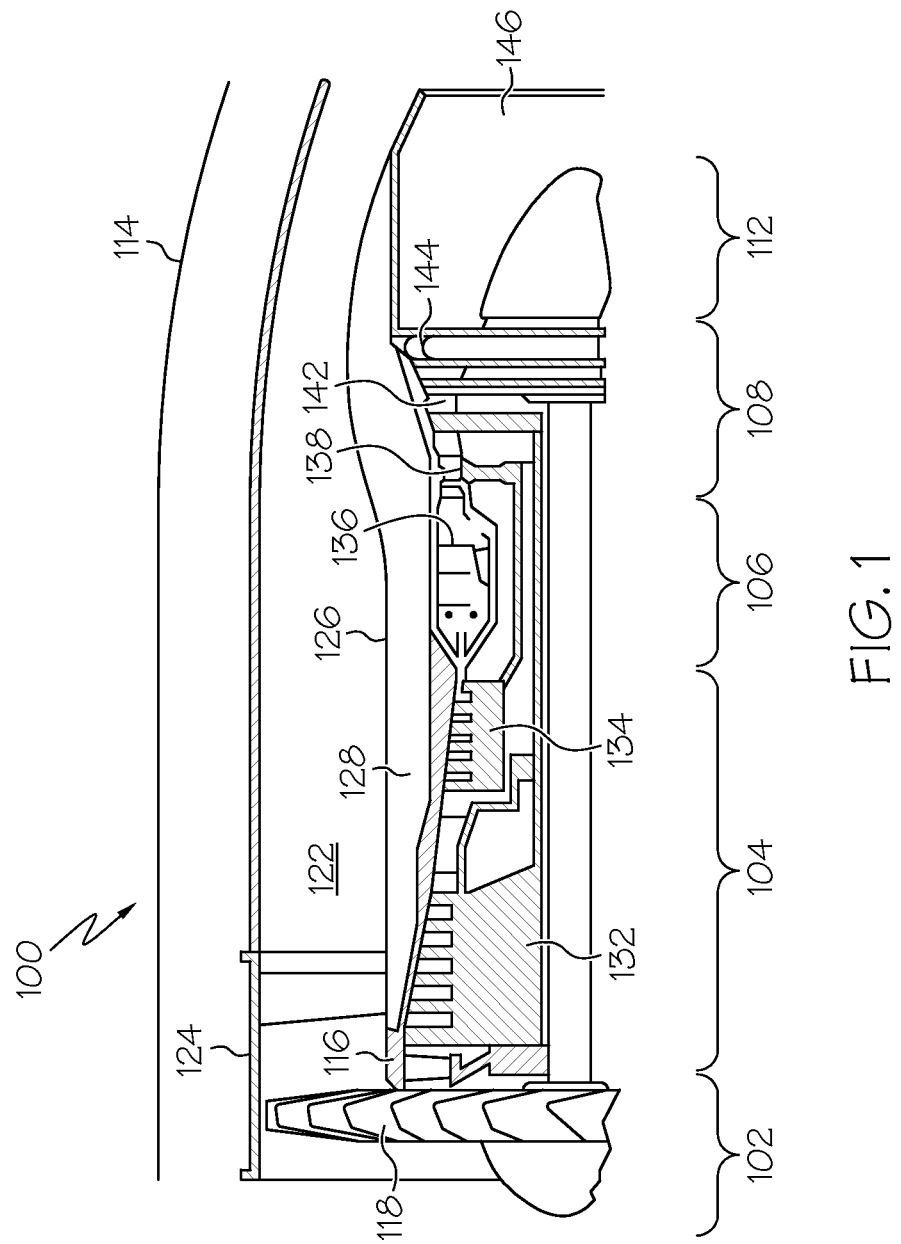
FIG. 1 depicts a simplified cross section view of a portion of a turbofan gas turbine propulsion engine.

Referring now to FIG. 1, a simplified cross section view of a turbofan gas turbine propulsion engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. As will be described further below, a portion of the fan air in the fan air bypass duct 122 is continuously or selectively directed into a first plenum 128, and another portion is selectively directed into a second plenum (not depicted in FIG. 1), which may or may not be fluidly isolated from the first plenum 128. In FIG. 1, the first plenum 128 is depicted as being disposed between the inner fan duct 126 and the engine case 116. In other embodiments, however, the first plenum 128 could be disposed within the engine case 116 (see FIG. 2). The fraction of fan air that does not flow into the fan air bypass duct 122 is directed into the compressor section 104.

The compressor section 104 can include one or more compressors. The engine 100 depicted in FIG. 1 includes two compressors—an intermediate pressure compressor 132 and a high pressure compressor 134. No matter the number of compressors it includes, the air that is directed into the compressor section 104 is pressurized to a relatively high pressure. The relatively high pressure air is then directed into the combustion section 106, which includes a combustor 136 to receive not only the relatively high pressure air, but atomized fuel. The relatively high pressure air and atomized fuel are mixed within the combustor 136 and the mixture is ignited to generate combusted air. The combusted air is then directed into the turbine section 108.

The depicted turbine section 108 includes three turbines—a high pressure turbine 138, an intermediate pressure turbine 142, and a low pressure turbine 144—though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide addition forward thrust. As the turbines 138, 142, 144 rotate, each drives equipment in the gas turbine engine 100 via concentrically disposed shafts or spools as best seen in FIG. 1.

During operation, the temperatures within various portions of the engine 100 may reach relatively high temperatures. Thus, as depicted more clearly in FIG. 2, the engine 100 additionally includes a cooling air system 200 to provide cooling air to these various components within the engine 100. The cooling air system 200 extracts relatively hot air 202 from within the engine case 116, directs the relatively hot air 202 through a heat exchanger 204 to be at least selectively cooled, and then directs the selectively cooled air 206 back into the engine case 116 to provide cooling air to the various portions of the engine 100. As FIG. 2 further depicts, and as was mentioned above, a portion of the fan air in the fan air bypass duct 122 is directed into the first plenum 128 via a first inlet 208. In some embodiments, as was previously noted, the first plenum 128 may be disposed between the inner fan duct 126 and the engine case 116, so that the fan air that is directed into the first plenum 128 provides cooling air to the engine case 116. In other embodiments, as depicted in phantom in FIG. 2, the first plenum is within the engine case 116.

As was also mentioned above, another portion of the fan air in the fan air bypass duct 122 is directed into a second plenum 212, via a second inlet 214, which, at least in the depicted embodiment, is fluidly isolated from the first plenum 128. When fan air is directed into the second plenum 212, it flows through the heat exchanger 204 to cool the relatively hot air 202 that is extracted from the engine case 116, and is then directed back into the fan air bypass duct 122.

Figure 2:
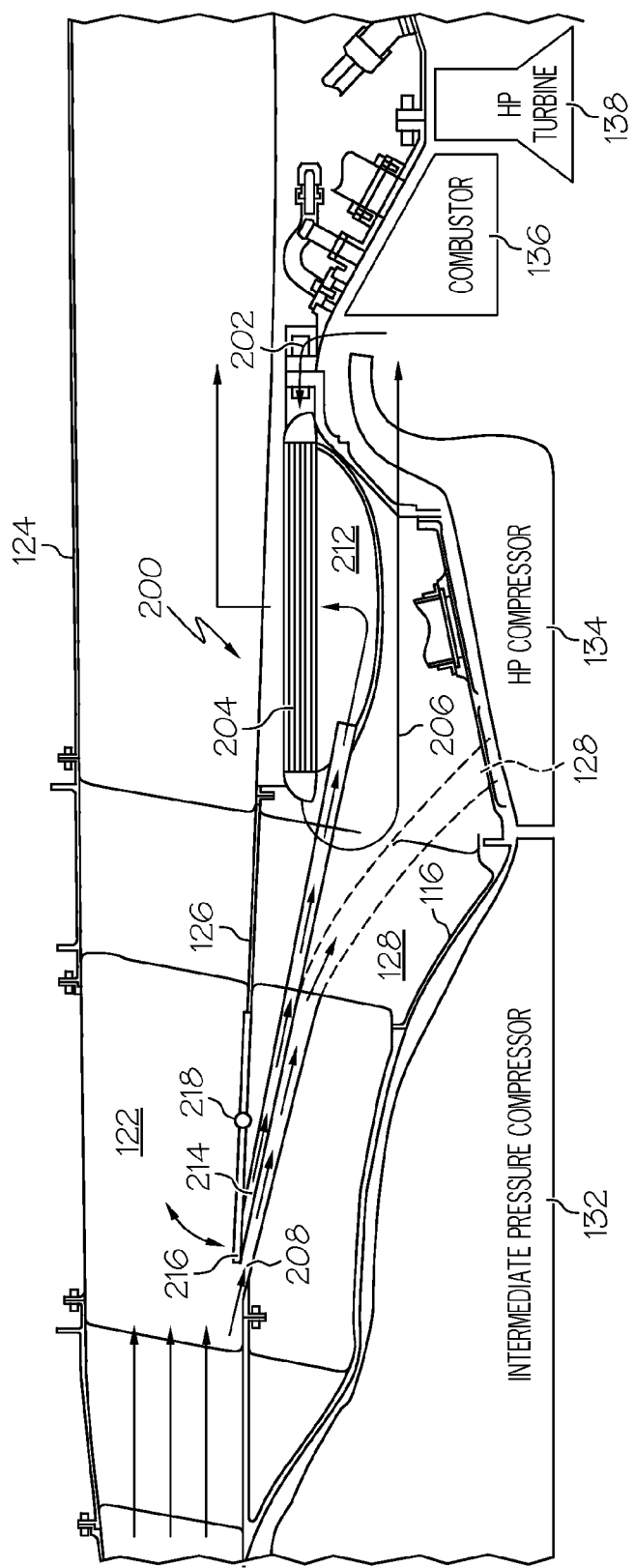
FIG. 2 depicts a close-up cross section view of a portion of the turbofan gas turbine engine of FIG. 1, illustrating an embodiment of a cooling air system.

In the embodiment depicted in FIG. 2, fan air is only selectively directed into the second plenum 212 because a door 216 is movably mounted on the inner fan duct 126, and is movable between a closed position and an open position. In the closed position, which is the position depicted in FIG. 2, the door 216 prevents fan air from flowing through the second inlet 214 and into the second plenum 212. In the open position, however, fan air may flow through the second inlet 214 and into the second plenum 212. The door 216 is preferably moved between the closed and open positions via an actuator 218. It will be appreciated that the actuator 218 may be implemented using any one of numerous types of passive or active actuator devices now known or developed in the future.

For clarity and ease of illustration, the first inlet 208 and the second inlet 214 are depicted in simplified form in FIG. 2. However, as depicted more clearly in FIG. 3, the first inlet 208 is preferably implemented as a NACA scoop 302, and the second inlet 214 is preferably implemented as a Pitot scoop 304. The NACA scoop 302 and Pitot scoop 304 implement an air flow directing system 300 that, at least in the depicted embodiment, is implemented as an integrated structure. In other embodiments, the system 300 may be implemented as separate components.

A NACA scoop 302, which may also be referred to as a NACA inlet or a NACA duct, is a known low-drag submerged air inlet structure that was originally developed by the U.S. National Advisory Committee for Aeronautics (NACA), the precursor to NASA. The NACA scoop 302 allows fan air to flow into the first plenum 128 with minimal disturbance to the flow, and includes two side walls 306-1, 306-2, a bottom wall 308, and an entrance lip 312. The side walls 306-1, 306-2 are recessed into the inner fan duct 124, are preferably curved, and diverge away from each other. The bottom wall 308 is shallowly ramped and is also recessed into the inner fan duct 126. The entrance lip 312 is defined by a portion of the inner fan duct 126 and is spaced apart from the bottom wall 308 to form a NACA scoop air inlet 314 that extends through the inner fan duct 126 to fluidly communicate the bypass flow passage 122 with the first plenum 128.

Figure 3:
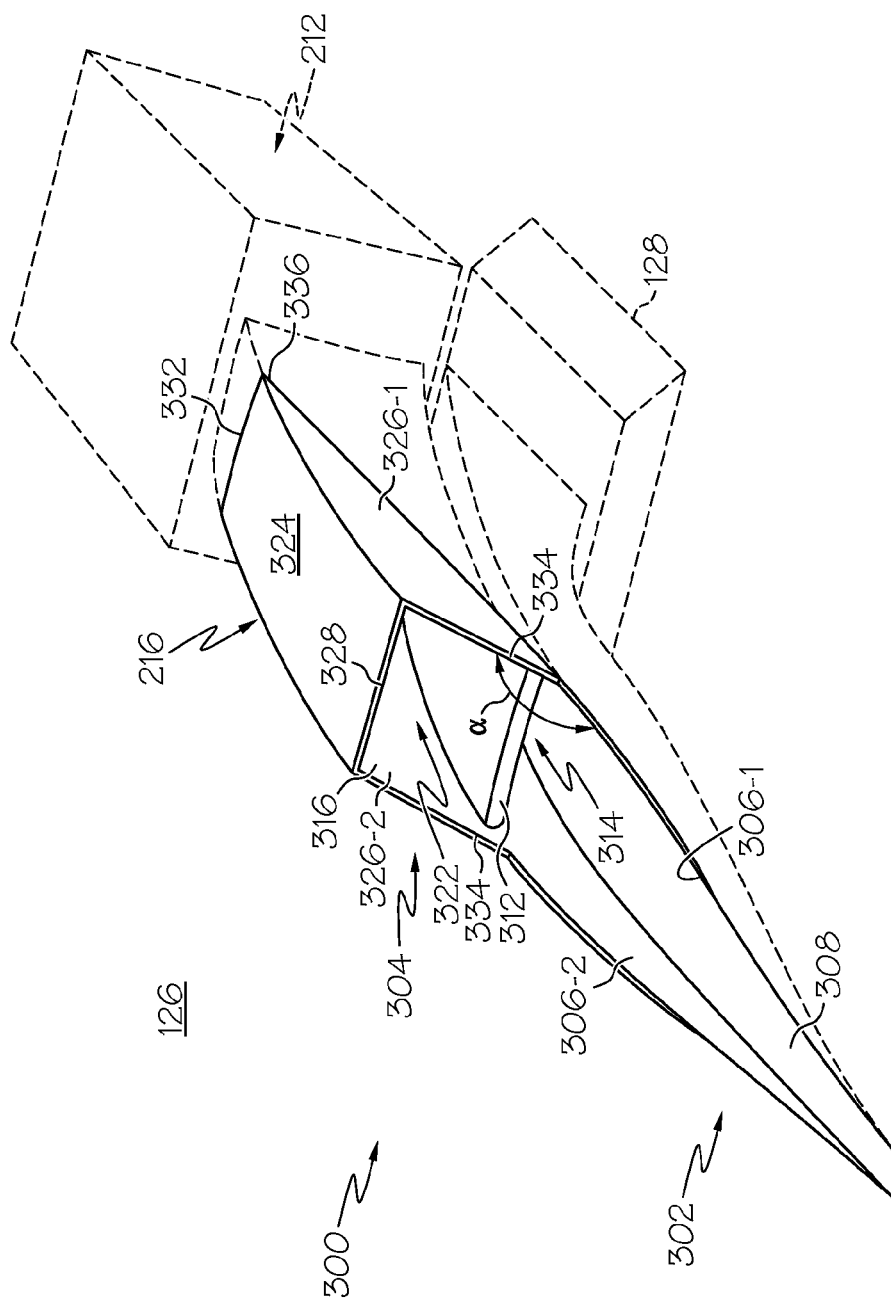
FIGS. 3 and 4 depict isometric views of an air flow directing system within and outside of the engine depicted in FIGS. 1 and 2, respectively.
Figure 4:
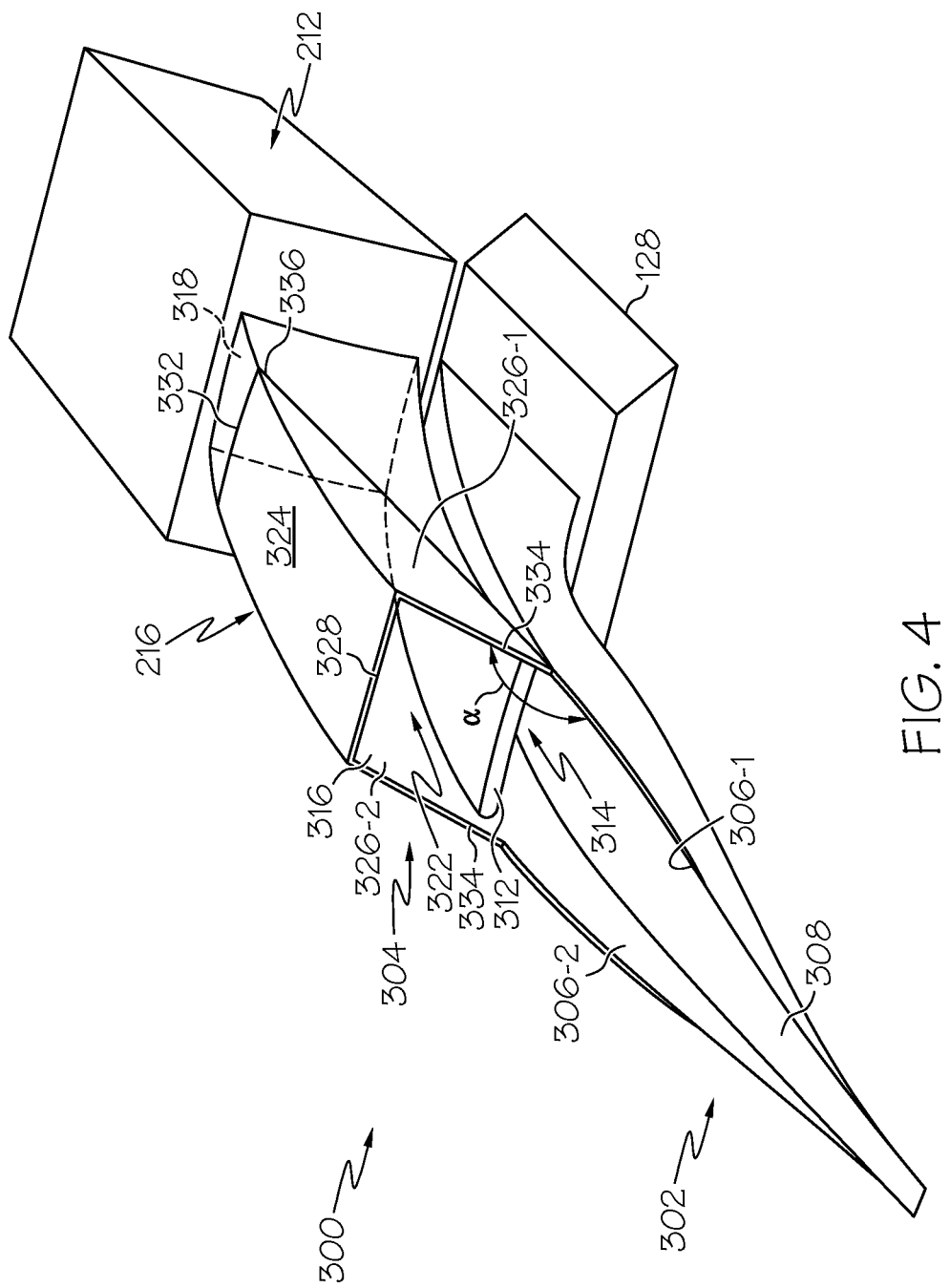
Figure 5:
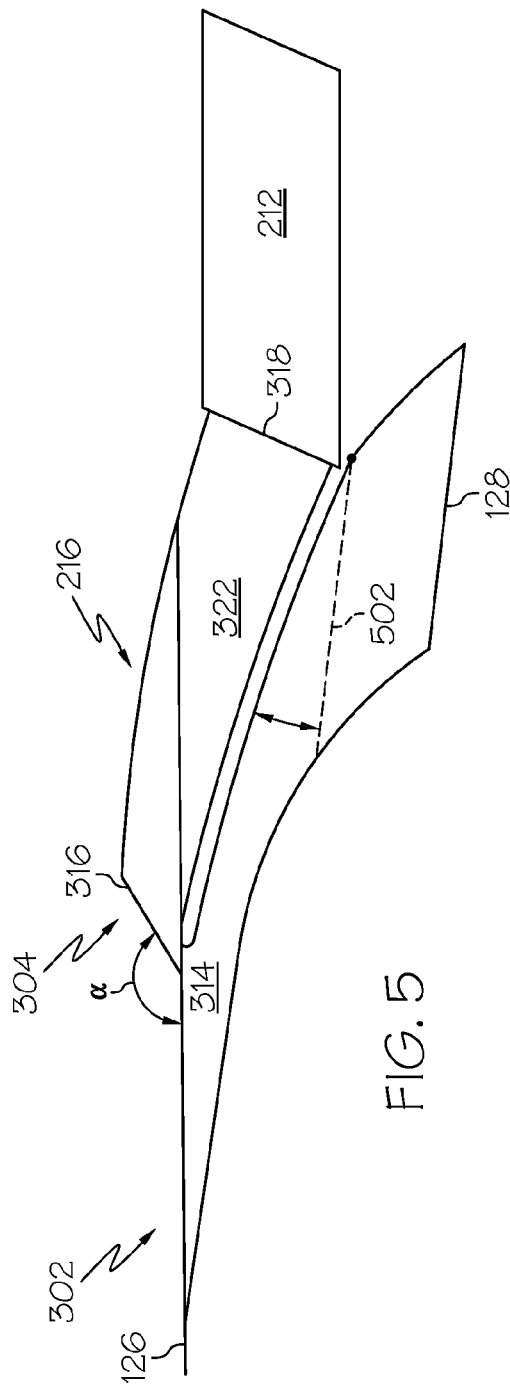
FIGS. 5 and 6 depict side views of the air flow directing system with the door in an open position and a closed position, respectively.

The Pitot scoop 304 is longitudinally aligned with the NACA scoop 302, and includes a Pitot scoop air inlet 316, a Pitot scoop air outlet 318 (see FIG. 4), and a Pitot scoop flow passage 322 between the Pitot scoop air inlet 316 and the Pitot scoop air outlet 318. The Pitot scoop air inlet 316 is defined, at least partially, by the entrance lip 312, and the Pitot scoop air outlet 318 is in fluid communication with the second plenum 212. It is noted that the Pitot scoop 304 is depicted in FIGS. 3-5 with the door 216 open. As may be readily seen, when door 216 is in the open position it defines at least a portion of the Pitot scoop air inlet 316 and at least a portion of the Pitot scoop flow passage 322.

More specifically, the door 216 depicted in FIGS. 3-6 includes a top wall 324 and two side walls 326-1, 326-2. The top wall 324 is shaped to have a slightly convex (with respect to the inner fan duct 126), curved cross sectional shape, and has a forward end 328 and an aft end 332. It will be appreciated that in other embodiments the top wall 324 may be alternatively shaped. For example, its cross sectional shape may be flat or concavely curved. The forward end 328 seals against the entrance lip 312 when the door 216 is in the closed position (see FIG. 6). The aft end 332 is movably coupled to the inner fan duct 126 to facilitate movement of the door 216 between the closed position and the open position.

Figure 6:
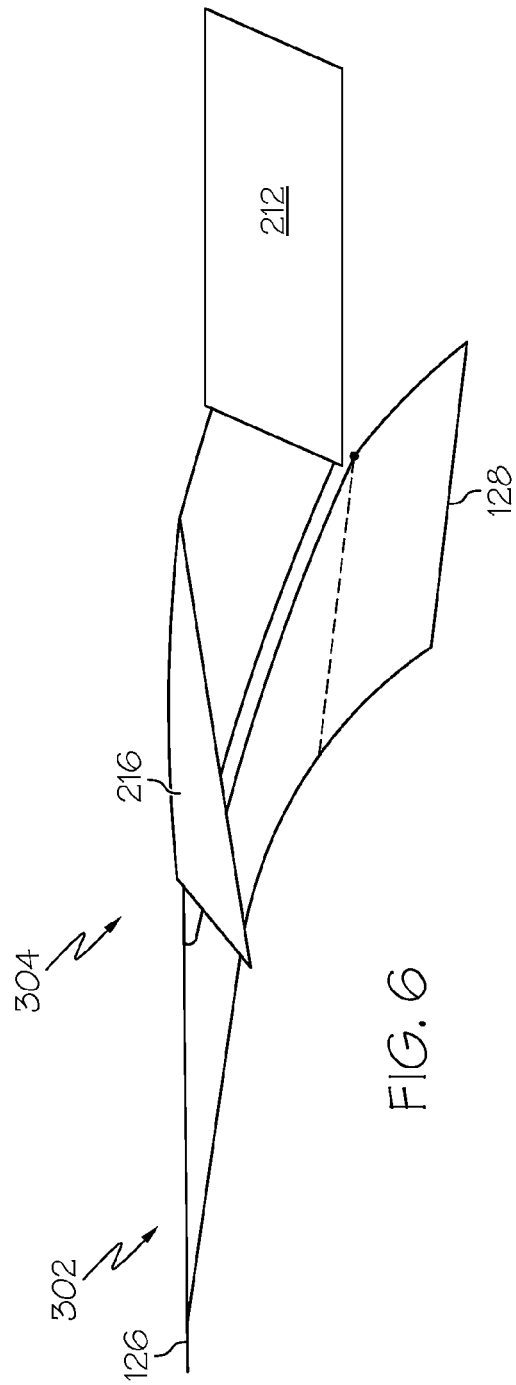

The side walls 326-1, 326-2 each include a forward end 334 and an aft end 336, and extend downwardly from the top wall 324. The side walls 326-1, 326-2 are greater in height at the forward ends 334 than at the aft ends 336. The side walls 326-1, 326-2 are also preferably configured such that, when the door 216 is in the open position, the forward ends 334 are disposed non-perpendicular to the entrance lip 312. More specifically, when the door 216 is in the open position, the forward ends 334 are disposed at an obtuse angle ($\alpha$) relative to the surface of the inner fan duct 126 (see FIG. 5). This configuration reduces pressure loss as fan air flows into and through the Pitot scoop 304. It will be appreciated that this configuration of the side walls forward ends 334 is merely exemplary of one embodiment, and that numerous other configurations could be implemented. The door 216 depicted in FIGS. 3-6 is additionally configured to be slightly wider than the entrance lip 312. Thus, as depicted in FIG. 6, when the door 216 is in the closed position, the side walls 326-1, 326-2 may retract into non-illustrated slots formed in the inner fan duct 126, and not obstruct flow through the NACA scoop 302.

In addition to the door 216 that selectively allows and prevents air flow into the Pitot scoop 304, the cooling air system 200 may, in some embodiments, also include a NACA scoop door 502. If included, the NACA scoop door 502, which is depicted in phantom in FIG. 5, is movably coupled to the inner fan duct 126 and is movable between a closed position and an open position. In the closed position, air is prevented from flowing through the NACA scoop air inlet 314 and into the first plenum 128. In the open position, air may flow through the NACA scoop inlet 214 and into the first plenum 128. It will be appreciated that the location and configuration of the NACA scoop door 502 may vary, and that the location and configuration depicted in FIG. 5 are merely exemplary.

The configuration of the door 216 and Pitot scoop 304 depicted in FIGS. 3-6 and described above are merely exemplary of one particular embodiment. In other embodiments, such as the one depicted in FIGS. 7 and 8, the door 216 may be configured with a substantially flat top wall 702, and thus be flush (or at least nearly flush) with the inner fan duct 126 when it is in the closed position. Though not depicted in FIGS. 7 and 8, it will be appreciated that this alternatively configured door 216 may be configured with either perpendicular or non-perpendicular side walls. It will additionally be appreciated that in other embodiments, the Pitot scoop 304 may configured such that the top wall 324 and the side walls 326-1, 326-2 do not define the movable door 216. Rather, these structures are non-movable configured such that the Pitot scoop air inlet 316 is continuously open, so that fan air may continuously flow through the Pitot scoop into the second plenum 212.

In still other embodiments, such as the one depicted in FIG. 9, the air flow directing system 300 may include an interconnecting door 902. The interconnecting door 902 is movable between a closed position and an open position. In the closed position, flow through the NACA scoop air inlet 314 is independent of the flow through the Pitot scoop air inlet 322, and vice-versa. In the open position, however, air flow through the NACA scoop air inlet 314 may aide air flow through the Pitot scoop air inlet 322, or vice-versa. Moreover, should the door 216 become inoperable in the closed position or a partially open position, the interconnecting door 902 may be opened to allow a portion of the air flowing through the NACA scoop air inlet 314 to be diverted into the second plenum 212. It will be appreciated that the location and configuration of the interconnecting door 902 may vary, and that the location and configuration depicted in FIG. 9 are merely exemplary.

The air flow directing system 300 described herein allows a portion of the fan air flowing in the bypass duct 122 of a turbofan engine 100 to be either continuously or selectively diverted from the bypass duct 122 with sufficient pressure to flow the diverted air through a heat exchanger 204 to cool air that is extracted from the engine for turbine cooling air, and then dump the diverted air back into the bypass duct 122. The system 300 also diverts a portion of the fan air with sufficient pressure to cool the engine case area. The NACA and Pitot scoops 302, 304 that comprise the system 300 can be individually or collectedly closed to reduce losses for conditions when bleed flow is not required.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for directing air flowing in a turbofan engine bypass flow passage into separate plena, the system comprising:
   an outer fan duct and an inner fan duct, the outer fan duct spaced apart from and surrounding the inner fan duct to define the bypass flow passage between the outer and inner fan ducts;
   a NACA scoop formed in the inner fan duct, the NACA scoop including two side walls, a bottom wall, and an entrance lip, the entrance lip defined by a portion of the inner fan duct and spaced apart from the bottom wall to form a NACA scoop air inlet that extends through the inner fan duct to fluidly communicate the bypass flow passage with a first plenum; and
   a Pitot scoop longitudinally aligned with the NACA scoop, the Pitot scoop including a Pitot scoop air inlet, a Pitot scoop air outlet, and a Pitot scoop flow passage between the Pitot scoop air inlet and the Pitot scoop air outlet, the Pitot scoop air inlet defined, at least partially, by the entrance lip, the Pitot scoop air outlet in fluid communication with a second plenum.

2. The system of claim 1, further comprising:
   a door movably mounted on the inner fan duct and movable between a closed position, in which air is prevented from flowing from the bypass flow passage through the Pitot scoop flow passage and into the second plenum, and an open position, in which air may flow from the bypass flow passage through the Pitot scoop flow passage and into the second plenum.

3. The system of claim 2, further comprising:
   a door actuator coupled to the door and configured to selectively move the door between the closed an open positions.

4. The system of claim 2, wherein the door, when it is in the open position, defines at least a portion of the Pitot scoop inlet and at least a portion of the Pitot scoop flow passage.

5. The system of claim 4, wherein the door includes two side walls that, when the door is in the open position, are disposed non-perpendicular to the entrance lip.

6. The system of claim 2, further comprising:
   a NACA scoop door coupled to the compartment wall and movable between a closed position, in which air is prevented from flowing through the NACA scoop air inlet and into the first plenum, and an open position, in which air may flow through the NACA scoop inlet and into the first plenum.

7. A system for supplying turbine cooling air flow, comprising:
   a turbofan engine including an engine case and a bypass flow passage, the engine case having an inner volume within which at least a gas turbine engine is mounted, the bypass flow passage defined by an outer fan duct and an inner fan duct and configured to direct fan air flow therethrough;
   a NACA scoop formed in the inner fan duct, the NACA scoop including two side walls, a bottom wall, and an entrance lip, the entrance lip defined by the inner fan duct and spaced apart from the bottom wall to form a NACA scoop air inlet that extends through inner fan duct to a first plenum;
   a heat exchanger disposed within the turbofan engine and including a heat exchanger first flow passage and a heat exchanger second flow passage, the heat exchanger first flow passage coupled to receive engine air from within the engine case, the heat exchanger second flow passage coupled to receive fan air from a second plenum, the heat exchanger configured to transfer heat between the engine air and the fan air; and
   a Pitot scoop longitudinally aligned with the NACA scoop, the Pitot scoop including a Pitot scoop air inlet, Pitot scoop air outlet, and a Pitot scoop flow passage between the Pitot scoop air inlet and the Pitot scoop air outlet, the Pitot scoop air inlet defined, at least partially, by the entrance lip, the Pitot scoop air outlet in fluid communication with the second plenum.

8. The system of claim 7, further comprising:
   a door movably mounted on the inner fan duct and movable between a closed position, in which fan air is prevented from flowing through the Pitot scoop flow passage and into the second plenum, and an open position, in which fan air may flow through the Pitot scoop flow passage and into the second plenum.

9. The system of claim 8, further comprising:
   a door actuator coupled to the door and configured to selectively move the door between the closed an open positions.

10. The system of claim 8, wherein the door, when it is in the open position, defines at least a portion of the Pitot scoop inlet and at least a portion of the Pitot scoop flow passage.

11. The system of claim 8, wherein the door includes two side walls that, when the door is in the open position, are disposed non-perpendicular to the entrance lip.

12. The system of claim 7, further comprising:
   a NACA scoop door coupled to the compartment wall and movable between a closed position, in which air is prevented from flowing through the NACA scoop air inlet and into the first plenum, and an open position, in which air may flow through the NACA scoop inlet and into the first plenum.

13. The system of claim 7, wherein the inner fan duct is spaced apart from and surrounds the engine case to define the first plenum.

14. The system of claim 7, wherein the first plenum is disposed within the engine case.

* * * * *